United States Patent
Frank et al.

(10) Patent No.: US 6,527,985 B1
(45) Date of Patent: Mar. 4, 2003

(54) METHOD FOR PRODUCING GRADIENT INDEX REFRACTION INDEX PROFILES IN POLYMER OPTICAL FIBERS

(75) Inventors: Werner Frank, Solnhofen (DE); Juergen Kaufhold, Dieburg (DE); Olaf Ziemann, Berlin (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/700,896

(22) PCT Filed: Apr. 30, 1999

(86) PCT No.: PCT/EP99/02954
§ 371 (c)(1),
(2), (4) Date: Nov. 20, 2000

(87) PCT Pub. No.: WO99/59803
PCT Pub. Date: Nov. 25, 1999

(30) Foreign Application Priority Data

May 20, 1998 (DE) .......................................... 198 22 684

(51) Int. Cl.[7] .............................................. B29D 11/00
(52) U.S. Cl. ....................... 264/1.27; 264/1.36; 264/2.6
(58) Field of Search ................................ 264/1.1, 1.24, 264/1.27, 1.36, 1.39, 2.1, 2.6

(56) References Cited

U.S. PATENT DOCUMENTS

| | | | |
|---|---|---|---|
| 3,778,361 A | 12/1973 | Courtney-Pratt | |
| 4,455,267 A | * 6/1984 | Strahan et al. | ............. 264/1.27 |
| 6,200,503 B1 | * 3/2001 | Katoot et al. | ............. 264/1.27 |

FOREIGN PATENT DOCUMENTS

| | | |
|---|---|---|
| DE | 38 20 011 | 12/1989 |
| DE | 196 27 536 | 1/1998 |
| EP | 87/01071 | 2/1987 |
| JP | 63 033705 | 2/1988 |

OTHER PUBLICATIONS

Tschudi et al., "Light induced polymer structures (LIPS) for diffractive optics," Institute of Electrical Engineers, Stevenage, GB, Database accession No. 5919757.
Moc/Grin '97, Technical Digest of the Sixth Microoptics Conference and the Fourteenth Topical Meeting on Gradient–Index Optical Systems, Proceedings of 1997 6th Microoptics Conf./14th Topical Meeting on Gradient Index Optical Systems, Tokyo, Japan, 7, 1977, Japan Soc. Appl. Phys., Japan, pp. 198–199.
*Ziemann, Olaf, "Grundlagen und Anwendungen Optischer Polymerfasern", Optische Polymertasern, Nov./Dec. 1996, vol. 50, nos. 11 and 12, pp. 1–67.
*Frank, W.F.Z., et al., "Optical Waveguides in Polymer Materials by Ion Implantation", SPIE, 1991, vol. 1559, pp. 344–353.
*"Transmission Characteristics of Optical fibers", Optical Fiber Communications, Principles and Practice, 2nd Edition, 1992, pp. 84–98.
*"Optical Detectors", Optical Fiber Communications, Principles and Practice, 2nd Edition, 1992, pp. 419–453.

(List continued on next page.)

Primary Examiner—Mathieu D. Vargot
(74) Attorney, Agent, or Firm—Kenyon & Kenyon (57) ABSTRACT

In a method for producing graded-index profiles in polymeric optical fibers, ionizing radiation is used to cause an increase in the refractive index, for example in PMMA. Polymeric optical fibers, preforms or fiber-core preforms are irradiated with ionizing radiation of predetermined wavelength and dose while being moved past the radiation source in the longitudinal direction at a given speed and are subsequently tempered for a defined length of time. Through the control of the spatial distribution of the ionizing radiation with the aid of mirrors, lenses or aperture systems, a uniform, radial graded-index profile is produced over the entire fiber length, so that the polymeric fiber, used as an optical waveguide, has improved transmission characteristics for optical signals.

18 Claims, 5 Drawing Sheets

OTHER PUBLICATIONS

*"Direct Detection Receiver Performance Considerations", Optical Fiber Communications, Principles and Practice, 2$^{nd}$ Edition, 1992, pp. 467–474.

*"Optical Fiber Measurements", Optical Fiber Communications, Principles and Practice, 2$^{nd}$ Edition, 1992, pp. 774–834.

*"Optical Fibers and Cables", Optical Fiber Communications, Principles and Practice, 2$^{nd}$ Edition, 1992, pp. 178–209.

*"Optical Fiber Connection: Joints and Couplers", Optical Fiber Communications, Principles and Practice, 2$^{nd}$ Edition, 1992, pp. 210–280.

* cited by examiner

METHOD FOR PRODUCING GRADIENT INDEX REFRACTION INDEX PROFILES IN POLYMER OPTICAL FIBERS

FIELD OF THE INVENTION

The present invention relates to a method for producing graded-index profiles, i.e., graded refractive-index profiles, in polymeric optical fibers.

RELATED TECHNOLOGY

The use of optical waveguides made of quartz-glass fibers for optical signal transmission is common practice today in the field of communications engineering. Apart from the material specifications and numerical aperture, the transmission characteristics and transmission quality are essentially determined by the usually radially symmetrical refractive-index profile in the fiber core. Typical transmission characteristics are fiber attenuation, material and modal dispersion, transmission rate and bandwidth/length product (as presented, for example, in: John M. Senior: *Optical Fiber Communications*, Second Edition; Prentice Hall international series in optoelectronics, 1992).

At present, besides the "multimode graded-index fibers", it is predominantly single-mode step-index fibers that are used in practice for telecommunications. Standard multimode graded-index fibers have an axially symmetrical, parabolic refractive-index profile The diameter of the fiber core is normally 50 $\mu$m. Conversely, standard single-mode step-index fibers have a stepped refractive-index profile in the core region, with a mode-field diameter in the core of normally between 9 $\mu$m and 10 $\mu$m. The normally used total diameter of both types of fiber is 125 $\mu$m.

A decisive factor for the satisfactory transmission characteristics of these fibers is the sharp decrease in modal dispersion owing to the selected refractive-index profile, this considerably reducing the signal overlap which is detectable in the case of long transmission distances. In a single-mode fiber, ideally only one mode is capable of propagation and consequently possesses excellent transmission characteristics.

In addition to fibers based on quartz glass, use is also made of polymeric optical waveguides for optical signal transmission (for information on the level of development, see: O. Zieman: *Grundlagen und Anwendungen optischer Polymerfasern* [Bases and Applications of Optical Polymer Fibers], Der Femmelde-ingenieur, 50, No. 11/12, 1996). Besides fibers made of polycarbonate, polystyrene and polyvinyl chloride, preference is presently overwhelmingly given to fibers made of polymethyl methacrylate (hereinafter abbreviated to PMMA). The advantages of PMMA fibers, which have a standard diameter of 1 mm, are—in addition to their comparatively low manufacturing costs—their ease of use in the making of connections (connectors, splices) and in the construction of branching and coupling elements, as well as in their ease of end-surface treatment and their low sensitivity to external mechanical, physical and environmental influences. The transmission wavelengths presently usable lie in the visible spectral range.

The following remarks relate to the example of polymeric optical fibers made of PMMA, but apply analogously to other polymeric optical waveguides, as well.

Principal disadvantages of polymeric optical fibers made of PMMA lie in the material-inherent high attenuation of approximately 150 dB/km at the frequently used transmission wavelength of 650 nm, and also in the fact that the sole type of fiber commercially available at present exhibits very great modal dispersion as a consequence of its exclusively step-index profile. The step-index profile of a polymeric optical fiber exhibits a constant refractive-index profile across virtually the entire fiber diameter. Consequently, the possible transmission rate is relatively low and is also significantly dependent on the coupling conditions. A transmission distance of approximately 100 m can be regarded as realizable in practice for the data rate of, for example, 125 Mbit/s which is of interest for communications. The bandwidth/length product is calculated at 1.5 MHz·km for approximately 25 m fiber length and is measured at between 5 MHz·km and 6 MHz·km.

At present, polymeric optical fibers made of PMMA are employed especially in the field of machine control at low transmission rates, as well as in the field of sensor technology, robotronics and for simple illumination systems. The use of the more temperature-stable polycarbonate fiber is under discussion as a further application in the automotive field. Furthermore, there is considerable interest in using polymeric optical fibers over short distances, i.e., over the so-called "last 100 yards", "in-house" or in the field of office communications, such as local area network (LAN) applications.

In order to improve the transmission characteristics and thus to widen the area of possible applications for polymeric optical fibers, intensive efforts are being made to produce PMMA fibers which have a fiber core with a graded-index profile. There has been a known attempt to construct the desired parabolic refractive-index profile through so-called "interfacial-gel copolymerization". The different diffusion rates of various monomeric PMMA derivatives are exploited in order to produce a preform. PMMA fibers thus produced with a parabolic refractive-index profile and a core diameter of 600 $\mu$m are not yet commercially available. However, they are characterized by significantly increased data-transmission rates and by good attenuation values.

However, the processing speed is very slow owing to the rate of diffusion. Since the substances to be diffused always penetrate from outside, i.e., from the cladding surface of the fiber, there are significant restrictions with regard to the form of the refractive-index profile.

On the other hand, it is known (see: W. F. X. Frank et al.: *Optical Waveguides in Polymer Materials by Ion Implantation*, SPIE Vol. 1559 (1991) 344–353) that the refractive index of polymers can be changed with the aid of ionizing radiation.

SUMMARY OF THE INVENTION

Proceeding from the problems described above, an object of the present invention is to provide a method which makes it possible in simple manner to produce a polymeric optical fiber having a defined refractive-index profile that permits a high processing speed and high flexibility in the design of the refractive-index profile.

The present invention therefore provides a method for making a polymeric optical fiber having a graded-index profile, the method including exposing at least one of the polymeric optical fiber, a preform of the polymeric optical fiber, and a fiber-core preform of the polymeric optical fiber to ionizing radiation of predetermined dose and wavelength while moving the respective polymeric optical fiber, the preform of the polymeric optical fiber, and/or the fiber-core preform of the polymeric optical fiber along a center line of the respective polymeric optical fiber, the preform of the polymeric optical fiber, and/or the fiber-core preform of the polymeric optical fiber at a given speed; defining a spatial distribution of an intensity of the ionizing radiation in the respective polymeric optical fiber, the preform of the polymeric optical fiber, and/or the fiber-core preform of the polymeric optical fiber over an entire irradiated length of the respective polymeric optical fiber, the preform of the polymeric optical fiber, and/or the fiber-core preform of the polymeric optical fiber using a system of optical elements so that the ionizing radiation is rotationally symmetrical; and then tempering the respective polymeric optical fiber, the preform of the polymeric optical fiber, and/or the fiber-core preform of the polymeric optical fiber for a predetermined time at a predetermined temperature so as to change a respective refractive index of respective irradiated regions of the respective polymeric optical fiber, the preform of the polymeric optical fiber, and/or the fiber-core preform of the polymeric optical fiber so as to form the graded index profile, the graded-index profile being a uniform radial graded-index profile.

In the method according to the present invention, ionizing radiation is used to cause chemico-physical changes in the material of a polymeric optical fiber which change the refractive index in the polymeric optical fiber in such a manner that a uniform, radial, graded-index profile perpendicular to the longitudinal axis of the polymeric optical fiber is formed along the entire fiber length, preferably in the core region. Furthermore, the method according to the present invention is suitable for additionally producing specific changes, if required, in the refractive-index profile of the fiber cladding. According to the present invention, a fiber preform may also be irradiated instead of the polymeric optical fiber. Likewise, it is possible for the later fiber core in the form of a preform (hereinafter referred to as "fiber-core preform" for reasons of simplification) to be irradiated on its own if a so-called "rod-in-tube" process is selected for fiber production. In this case, after irradiation and, where appropriate, after tempering, the fiber-core preform is introduced with precise fit into an equally long hollow cylinder, provided as the fiber cladding material, and the fiber is drawn off jointly from said preform arrangement at higher temperature.

For the changes in the core region, the polymeric optical fiber, the preform or the fiber-core preform is irradiated at least once with the ionizing radiation while being moved in the longitudinal direction. In so doing, the irradiation should be rotationally symmetrical, so that a uniform, radial graded-index profile is actually obtained.

Given a suitable type and duration of the ionizing radiation, the change in refractive index caused by the irradiation produces the correct refractive-index profile. Tempering (holding the polymeric optical fiber, the preform or the fiber-core preform at a defined temperature, higher than the operating temperature, for a given period of time) finally optimizes the refractive-index profile in such a manner that the desired uniform, radial graded-index profile is formed.

Rotationally symmetrical irradiation may be achieved by either the polymeric optical fiber, the preform or the fiber-core preform executing a rotating motion by a predetermined angle about the fiber center line, or by the system of optical elements rotating, together with one or more radiation sources, by a predetermined angle about the fiber center line.

Electromagnetic radiation (such as UV light, X-ray or gamma radiation, etc.) may be used as ionizing radiation.

Particle radiation (such as electrons, positrons, heavy ions, etc.) may be used as ionizing radiation.

A desired spatial distribution of the ionizing radiation in the fiber may be determined by a system of optical elements. These optical elements can be reflecting surfaces, lenses, cylindrical lenses or apertures.

In embodiments of the present invention, the type, rate and course of change in refractive index as well as attenuation may be influenced by various additions to the starting material of the fiber. Likewise, additions may be used to influence the wavelength or the effect of the particle type of the ionizing radiation required for the change in refractive index. Thus, for example, by using certain additives, it is possible to ensure that visible light causes a change in the refractive index. Furthermore, specific additives can be used to incorporate active and passive control elements into the fiber.

BRIEF DESCRIPTION OF THE DRAWINGS

Hereinbelow, the present invention is elaborated upon with reference to the drawings, in which.

DETAILED DESCRIPTION

To simplify the description, the use in the following of the designation POF with the reference numeral 1 refers not only to the polymeric optical fiber as such, but the designation stands analogously for the use of a fiber preform or a fiber-core preform, as well.

Figure 1A:
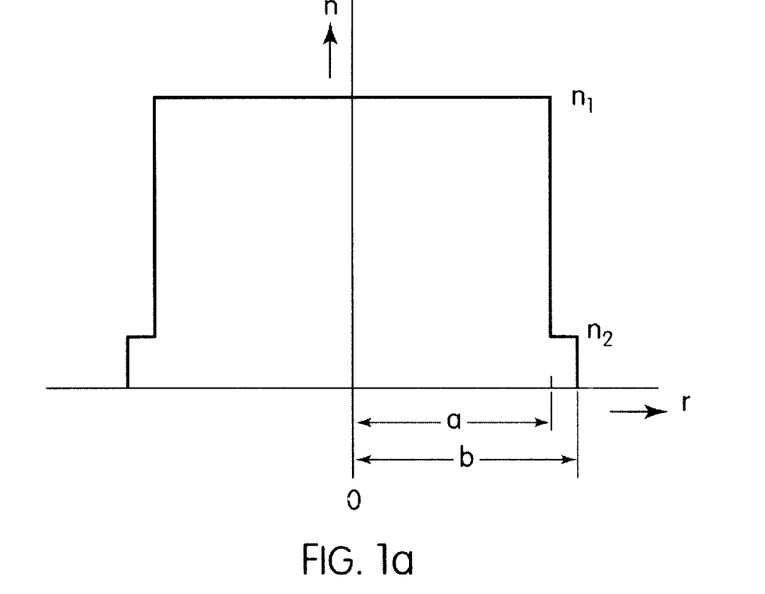
FIG. 1a: shows a graph of the refractive index profile over a cross-section through an optical fiber having a step-index profile.
Figure 1B:
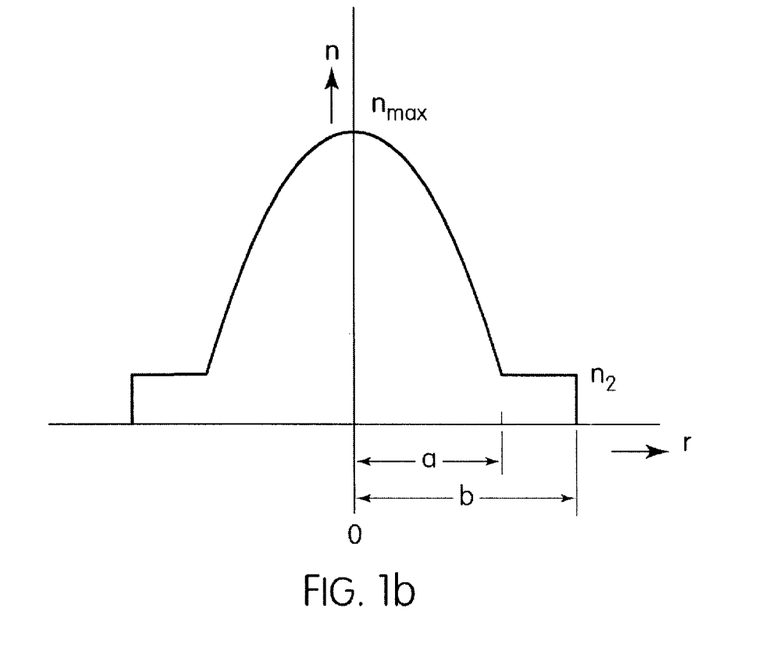
FIG. 1b: shows a graph of the refractive index profile over a cross-section through an optical fiber having a graded-index profile.

FIGS. 1a and 1b show schematically the profile of refractive index n over the cross-section of a POF 1. The refractive index along any line parallel to the longitudinal axis of POF 1 is constant. The simplest fiber type has a so-called step-index profile, as shown in FIG. 1a. POF 1 with core radius a and overall radius b is made in this case of two layers that have different refractive indices $n_1$ and $n_2$ and lie concentrically about the fiber core. The figure shows refractive index n over distance r from zero point 0 of the fiber center line. The core of POF 1 having the radius a is made of a plastic having the refractive index $n_1$. The fiber cladding $a < r \leq b$ has the refractive index $n_2$, where refractive index $n_1$ is greater than $n_2$. The propagation of light takes place inside the core having the refractive index $n_1$. The smaller the radius of fiber core a, the fewer modes of the light of a wavelength can be conducted through the fiber. In the optimal limiting case, only one mode of one wavelength is able to pass through the optical fiber.

Polymeric optical fibers having a customary core diameter of ≈1 mm are far removed from such an ideal case. A signal of relevance for communications will have a certain spectral signal width and will, therefore, be made of a plurality of wavelengths, each of which is capable of propagation in a plurality of modes. Since, however, the different wavelengths are conducted at different velocities in their propagatable modes owing to the different optical paths, the original form of the signals already spreads over relatively short transmission distances and already renders separation impossible at an early stage.

This situation can be improved by providing the fiber core with a graded-index profile. FIG. 1b shows a parabolic refractive-index profile as an example. In this case, as in FIG. 1a, POF 1 has a fiber cladding with a refractive index $n_2$. The core of POF 1 no longer has a uniform refractive index. Instead, it falls in parabolic manner from a refractive index $n_{max}$ in the fiber center within the region $0 \leq r \leq a$ to the value $n_2$. Such a refractive-index gradient has the characteristic that it refracts the different modes with different strengths toward the fiber center. Consequently, the differences in propagation time of the modes are substantially canceled out, the signals do not spread as quickly and the effective range of signal transmission increases considerably.

The method according to the present invention may be used to produce, in a simple and variable manner, such above-described graded-index profiles in the polymeric optical fiber, in a polymeric preform or a fiber-core preform.

Figure 2:
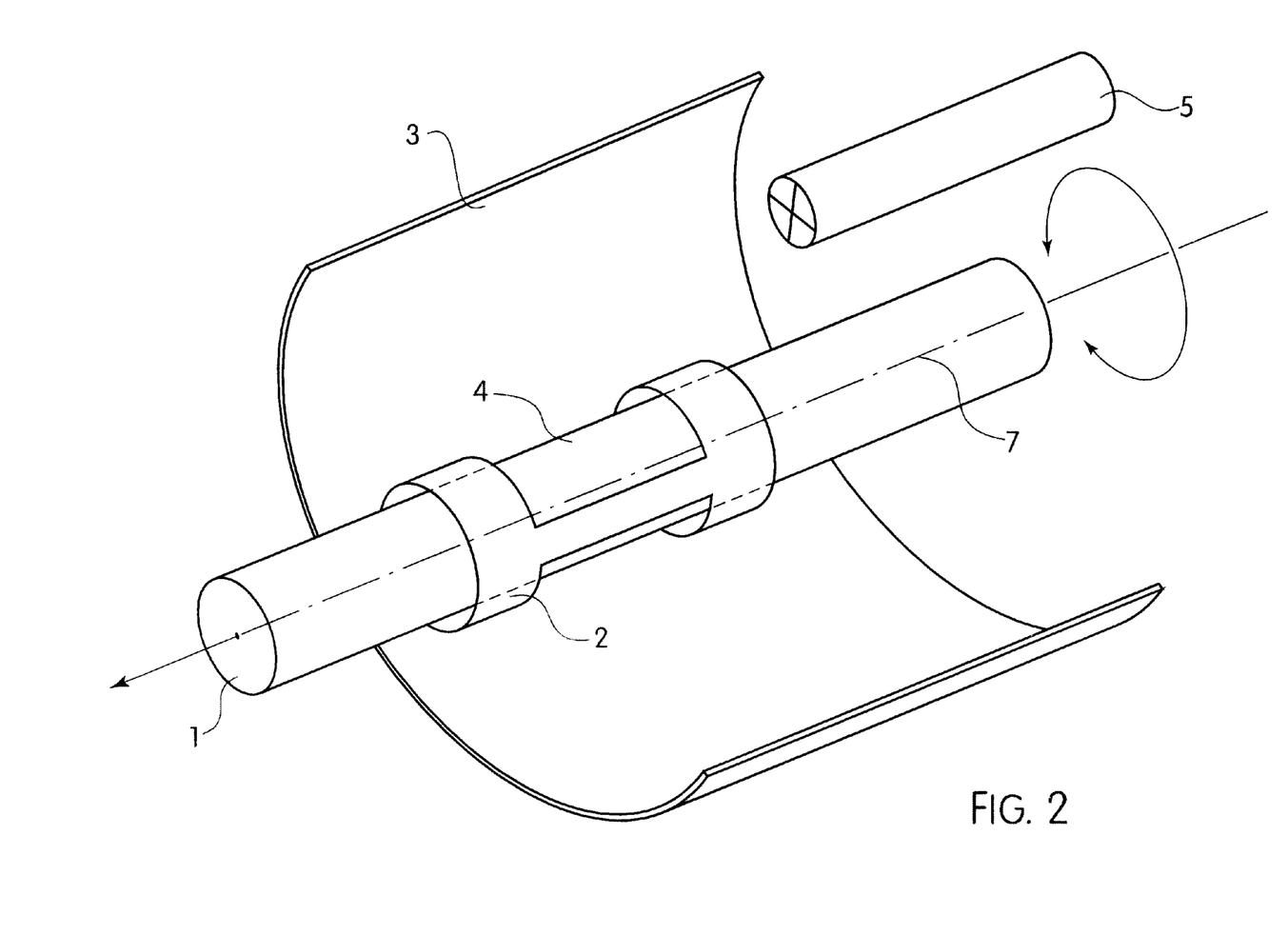
FIG. 2: shows a schematic perspective view of an apparatus for performing an embodiment of a method according to the present invention when using a parabolic mirror as an example of a reflecting and focusing surface.

FIG. 2 outlines a design, based on which the method according to the present invention is explained in greater detail by way of example. FIG. 2 shows a POF 1 with a fiber center line 7, a radiation source 5, a mirror 3 as well as a sleeve 2 with a window 4. POF 1 is exposed to ionizing radiation from radiation source 5 which, in this variant of the method, is intended to have a homogeneous radiation characteristic especially advantageous for focusing on fiber center line 7. For example, radiation source 5 can be a UV lamp. If the POF is made preferably of polymethyl methacrylate (PMMA), then the effective wavelength range commences at wavelengths of λ<380 nm, since, in this case, the UV absorption edge of PMMA has been reached and the radiation most suitably changes the chemico-physical structure in this range. For other materials, it is also possible to use other ranges of the electromagnetic spectrum. For example, by the addition of photosensitizing substances, it is possible to cause the desired changes in the polymers using light of the visible spectral range, as well.

Likewise, it is possible to employ particle radiation, such as electrons, positrons, etc., as ionizing radiation. The radiation is available, inter alia, in the form of radioactive preparations and could be suitably focused on POF 1, for example, through the action of electric or magnetic fields.

The ionizing radiation from radiation source 5 is now directed at POF 1 in such a manner that an inhomogeneous distribution in the radial direction of the radiation intensity in POF 1 is achieved. In the simplest case, the ionizing radiation is focused for this purpose at fiber center line 7 of POF 1, so that the change in refractive index is greatest at that point. As shown in FIG. 1b, the refractive index decreases toward the edge of POF 1. In this example, focusing is accomplished with the aid of mirror 3, which is ideally curved, for example, parabolically or elliptically about fiber center line 7 of POF 1. In this context, fiber center line 7 of POF 1 is situated precisely on the focal line of mirror 3. In order to obtain uniform, rotationally symmetrical irradiation, POF 1 and/or mirror 3 rotate by at least a defined angle about the longitudinal axis of POF 1. The angle depends on the geometry of mirror 3. Uniform irradiation is obtained when working with a rotation angle of 180° or more. It is also possible to use further mirrors 3 and further radiation sources 5 for uniform irradiation from all sides of POF 1. It is likewise conceivable to employ an annular radiation source. Maximum precision in the guidance of POF 1 parallel to the fiber axis is achieved by sleeve 2, which is provided with window 4. According to the present invention, self-supporting guidance of the fiber may also be accomplished in the form described in greater detail in FIG. 4.

The entire POF 1 is pulled during irradiation in the direction of the longitudinal axis through the system composed of mirror 3, radiation source 5 and sleeve 2. This ensures that the refractive index remains constant along fiber center line 7 of POF 1. The pulling speed is adapted to the respective time required to obtain the desired change in refractive index. The arrangement has the advantage that, by changing the shape of mirror 3, it is possible to control the distribution of radiation intensity in POF 1 and thus the refractive-index profile.

The process can be accelerated or decelerated by sensitizing additions which cause an additional chemical and/or physical change of POF 1 during irradiation. For example, these substances can be introduced during the manufacture of the fiber, preform or fiber-core preform through mixture of the starting materials or subsequently by diffusion. Likewise, it is possible to influence the refractive-index profile and the attenuation, respectively, by the quantity and distribution of the additives.

Furthermore, passive or active control elements can be realized in POF 1 by specific, optically active additions and/or suitably targeted radiative action.

After irradiation, POF 1 is tempered for a certain length of time, so that a time-stable refractive-index profile can be obtained. This can be accomplished, for example, by holding at a defined temperature (higher than the operating temperature), an operation which is frequently already a part of the manufacturing process.

The method according to the present invention is therefore characterized by ease of use, by flexibility in the choice of refractive-index profile and by the fact that—at least in part—continuous method operation is conceivable.

Figure 3:
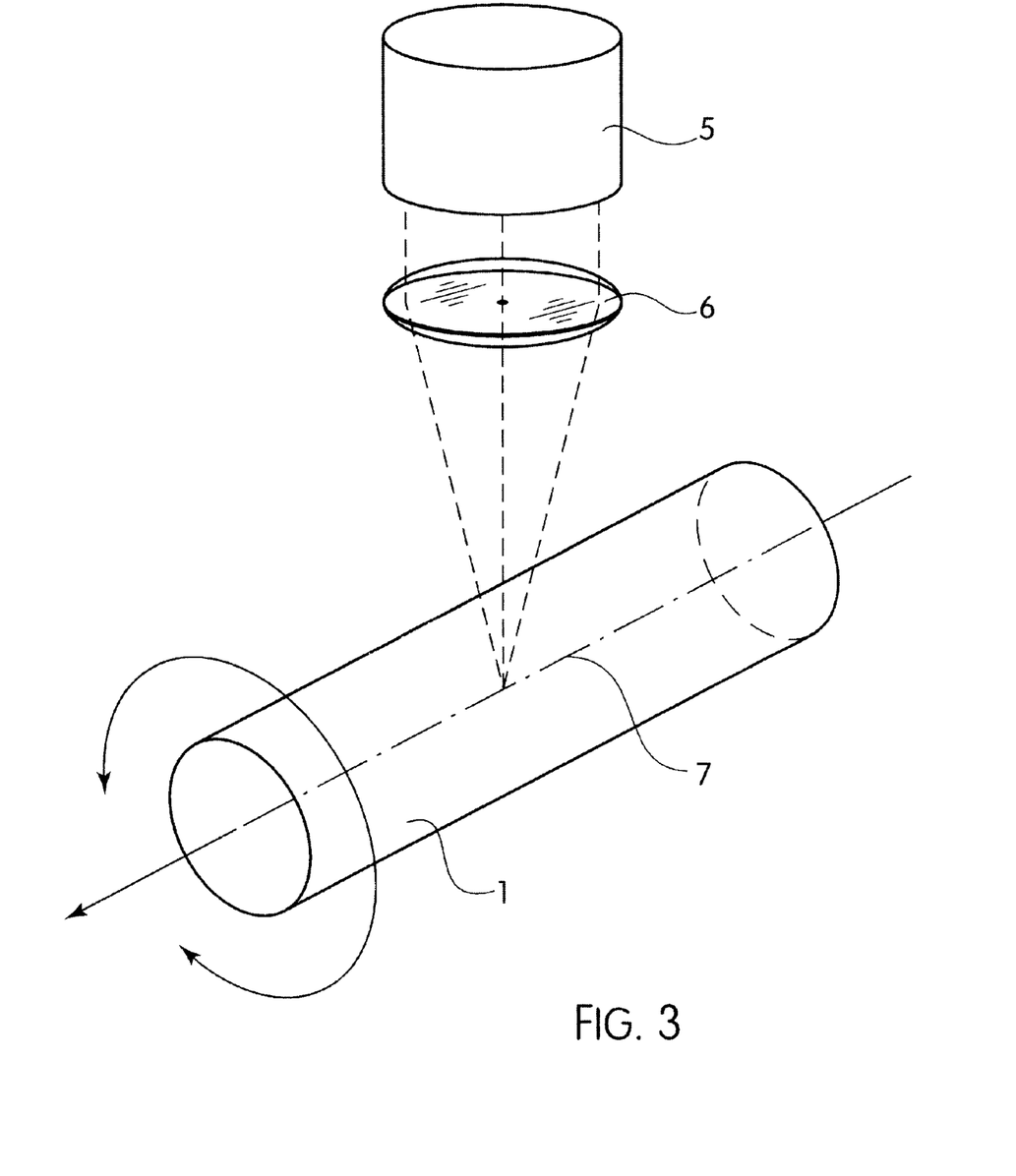
FIG. 3: shows a schematic perspective view of an apparatus for performing an embodiment of a method according to the present invention with rotating fiber and focused beam.

FIG. 3 shows an apparatus for performing an embodiment of the method according to the present invention in which at least one focusing unit 6, preferably a lens, is used for focusing the radiation. In this case, the radiation from radiation source 5 is focused by focusing unit 6 in the form of points or, if using a cylindrical lens, in the form of a line on focus line 7, which preferably corresponds with fiber center line 7. This, in turn, is where the irradiation intensity, and therefore also the change in refractive index, is the greatest. To obtain uniform, rotationally symmetrical irradiation, POF 1 rotates in the longitudinal direction of the fiber about fiber center line 7. The same is achieved if the focusing unit rotates about fiber center line 7, it being possible for the radiation source to be moved in synchronism.

Figure 4:
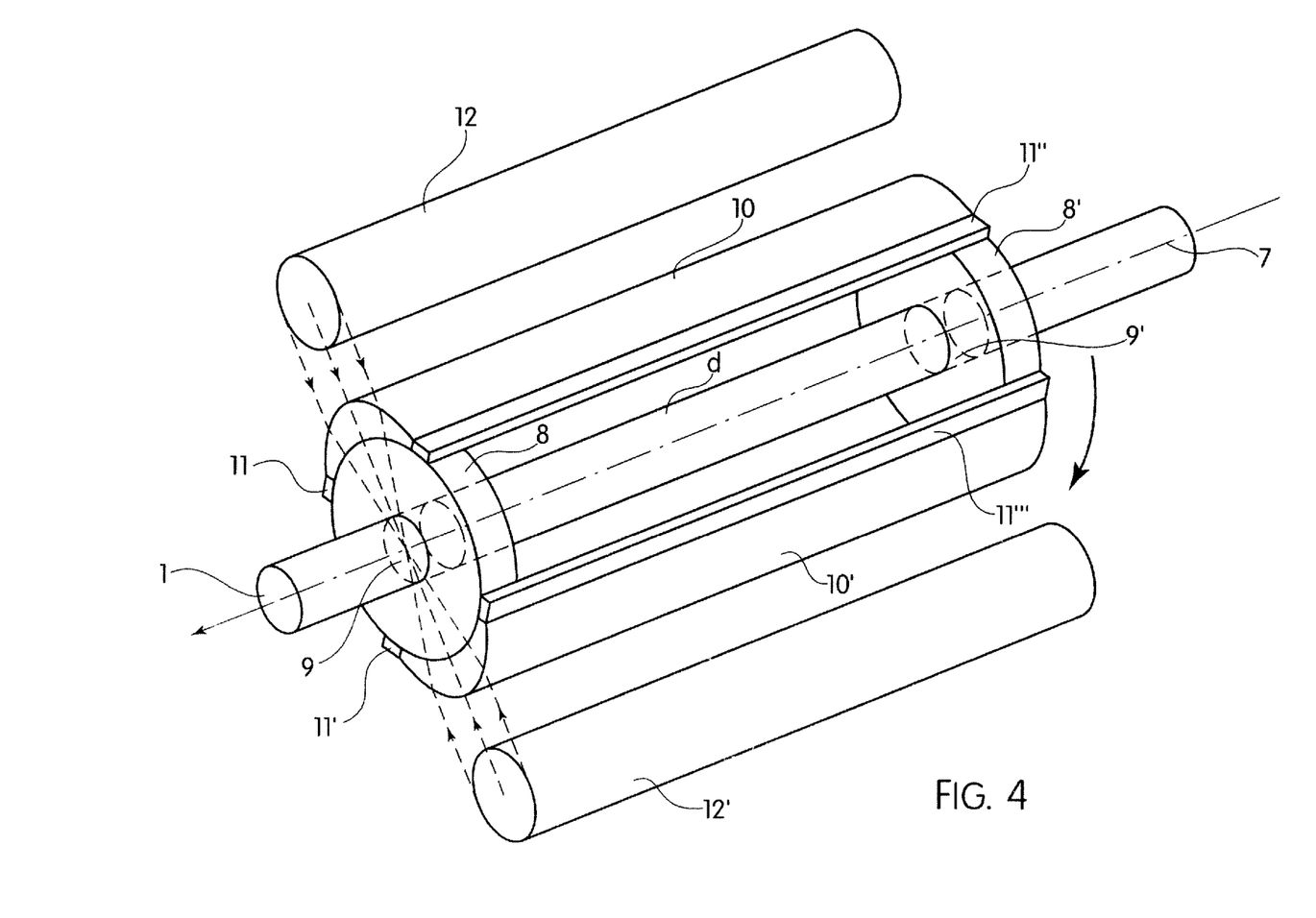
FIG. 4: shows a schematic perspective view of an apparatus for performing an embodiment of a method according to the present invention when using a plurality of cylindrical lenses for radiation focusing.

FIG. 4 shows schematically an apparatus for performing an embodiment of the method according to the present invention using a plurality of cylindrical lenses 10, 10'. In this case, POF 1 is freely guided, with minimum possible tolerance, over distance d through two circular discs 8, 8' with corresponding concentric openings 9, 9'. Provided on the periphery are at least one, but possibly a plurality of cylindrical lenses 10, 10'. The position of cylindrical lenses 10, 10' is secured by retaining bars 11 to 11", which can also serve as an adjusting device. A number—corresponding to the number of cylindrical lenses 10, 10'—of rod-shaped radiation sources 12, 12' may be provided above cylindrical lenses 10, 10' equidistant with respect to fiber center line 7. While POF 1 moves forward parallel to its fiber center line 7, cylindrical lenses 10, 10' rotate in synchronism with rod-shaped radiation sources 12, 12', possibly about fiber center line 7 of POF 1, this resulting in the desired refractive-index profile. This method is especially suitable for UV light.

Figure 5:
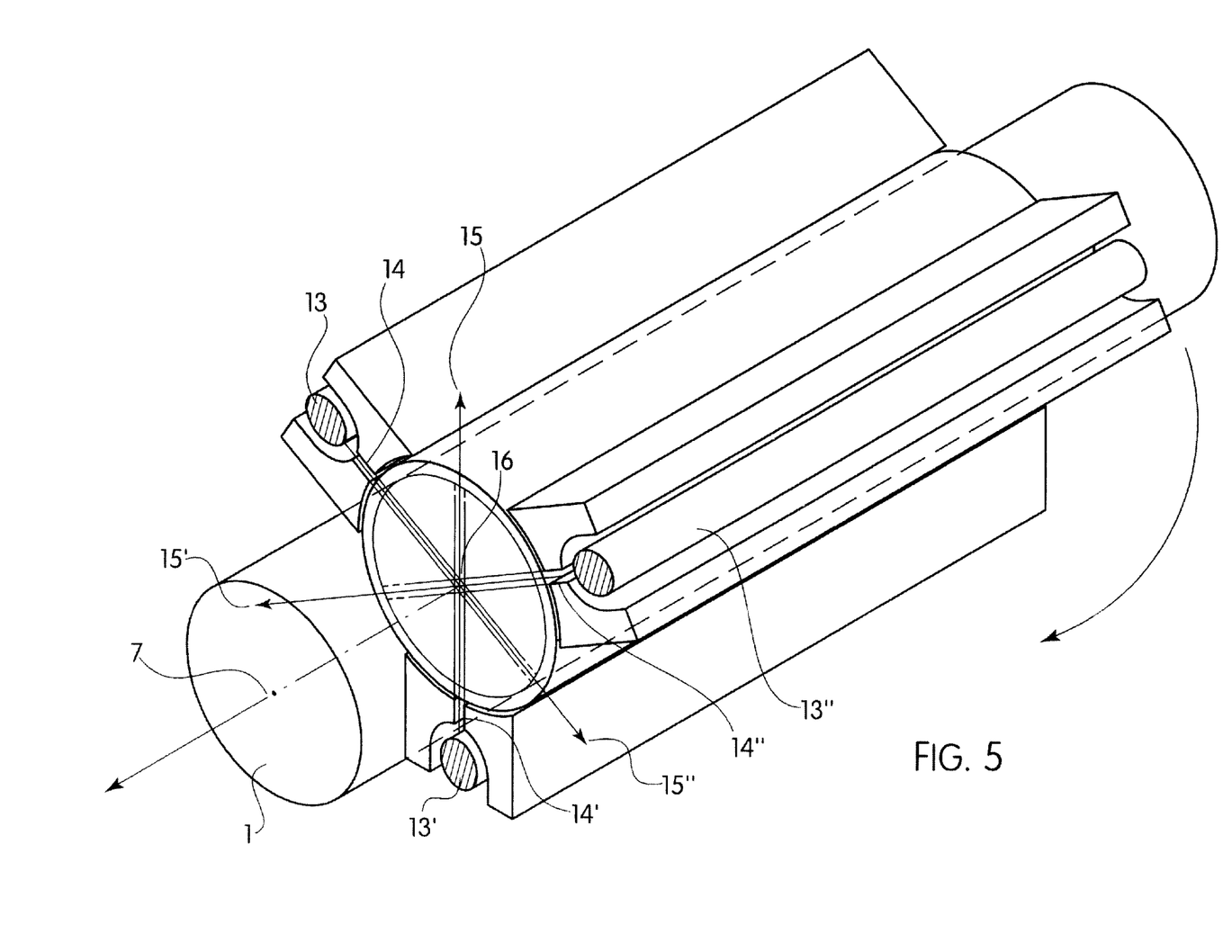
FIG. 5: shows a perspective schematic view of an apparatus for demonstrating how, using an arrangement of a plurality of apertures, a corresponding number of bundles of beams is directed at the fiber core in order to cause an increase in the radiation intensity there.

FIG. 5 shows a method variant which is suitable for producing a graded-index profile in a POF 1 through the use of X-ray or gamma radiation. In this case, the radiation, emanating, for example, from a plurality of high-energy radiation sources 13, 13', 13", is directed through a corresponding number of apertures 14, 14' and 14" of suitable geometry, in order to isolate out a corresponding number of narrow bundles of beams 15, 15' and 15" and to radiate them radially toward fiber center line 7. At the interface of the bundles of beams 16, an increase in refractive index is produced by the increased radiation intensity. During irradiation, POF 1 is moved forward in the direction of its longitudinal axis. Once again, in order to obtain the required refractive-index profile, high-energy radiation sources 13, 13', 13" rotate with apertures 14, 14, and 14" preferably about fiber center line 7 of POF 1.

It is also possible for non-polymeric materials (such as glass) to be treated in the described manner, provided a change in refractive index can be caused by ionizing radiation.

List of Reference Characters n Optical refractive index
$n_1$ Core refractive index of fiber as optical waveguide
$n_2$ Cladding refractive index of fiber as optical waveguide: $n_2 < n_1$
$n_{max}$ Maximum core refractive index for a parabolic refractive-index profile
r Radial distance from fiber center line
a Radius of fiber core
b Radius of overall fiber
0 Center point of circular fiber cross-sectional area
d Free fiber length
1 POF
2 Sleeve
3 Reflecting surface (mirror)
5 Radiation source
6 Lens
7 Fiber center line
8, 8' Circular discs
9, 9' Concentric openings
10, 10' Cylindrical lenses
11 to 11'" Retaining bars
12, 12' Rod-shaped radiation sources
13, 13', 13" High-energy radiation sources
14, 14', 14" Apertures
15, 15', 15" Bundles of beams
16 Interface of bundles of beams

What is claimed is:

1. A method for making a polymeric optical fiber having a graded-index profile, the method comprising:

exposing at least one of the polymeric optical fiber, a preform of the polymeric optical fiber, and a fiber-core preform of the polymeric optical fiber to ionizing radiation of predetermined dose and wavelength while moving the respective at least one of the polymeric optical fiber, the preform of the polymeric optical fiber, and the fiber-core preform of the polymeric optical fiber along a center line of the respective at least one of the polymeric optical fiber, the preform of the polymeric optical fiber, and the fiber-core preform of the polymeric optical fiber at a given speed;

defining a spatial distribution of an intensity of the ionizing radiation in the respective at least one of the polymeric optical fiber, the preform of the polymeric optical fiber, and the fiber-core preform of the polymeric optical fiber over an entire irradiated length of the respective at least one of the polymeric optical fiber, the preform of the polymeric optical fiber, and the fiber-core preform of the polymeric optical fiber using a system of optical elements so that the ionizing radiation is rotationally symmetrical; and then tempering the respective at least one of the polymeric optical fiber, the preform of the polymeric optical fiber, and the fiber-core preform of the polymeric optical fiber for a predetermined time at a predetermined temperature so as to optimize a respective refractive index of respective irradiated regions of the at least one of the polymeric optical fiber, the preform of the polymeric optical fiber, and the fiber-core preform of the polymeric optical fiber so that a uniform radial graded-index profile is formed.

2. The method as recited in claim 1 further comprising at least one of:

rotating the respective at least one of the polymeric optical fiber, the preform of the polymeric optical fiber, and the fiber-core preform of the polymeric optical fiber by a predetermined angle about the fiber center line; and rotating the system of optical elements together with at least one radiation source of the ionizing radiation by a second predetermined angle.

3. The method as recited in claim 2 wherein the ionizing radiation includes electromagnetic radiation.

4. The method as recited in claim 2 wherein the ionizing radiation includes particle radiation.

5. The method as recited in claim 3 wherein the system of optical elements includes at least one reflecting surface.

6. The method as recited in claim 4 wherein the system of optical elements includes at least one reflecting surface.

7. The method as recited in claim 3 wherein the system of optical elements includes at least one lense.

8. The method as recited in claim 4 wherein the system of optical elements includes at least one lense.

9. The method as recited in claim 3 wherein the system of optical elements includes at least one cylindrical lense.

10. The method as recited in claim 4 wherein the system of optical elements includes at least one cylindrical lense.

11. The method as recited in claim 3 wherein the system of optical elements includes at least one aperture.

12. The method as recited in claim 4 wherein the system of optical elements includes at least one aperture.

13. The method as recited in claim 1 further comprising:

adding a substance to a respective starting material of the respective at least one of the polymeric optical fiber, the preform of the polymeric optical fiber, and the fiber-core preform of the polymeric optical fiber so as to influence a rate of change of the respective refractive index; and adding a second substance to a respective second starting material of the respective at least one of the polymeric optical fiber, the preform of the polymeric optical fiber, and the fiber-core preform of the polymeric optical fiber so as to influence a respective refractive-index profile of the respective at least one of the polymeric optical fiber, the preform of the polymeric optical fiber, and the fiber-core preform of the polymeric optical fiber.

14. The method as recited in claim 1 further comprising adding a substance to a respective starting material of the respective at least one of the polymeric optical fiber, the preform of the polymeric optical fiber, and the fiber-core preform of the polymeric optical fiber so as to influence an attenuation of the polymeric optical fiber.

15. The method as recited in claim 1 further comprising adding a substance to a respective starting material of the respective at least one of the polymeric optical fiber, the preform of the polymeric optical fiber, and the fiber-core preform of the polymeric optical fiber so as to provide at least one of a passive and an active control element in the polymeric optical fiber.

16. The method as recited in claim 15 wherein the providing of the at least one passive and active control element is performed by a diffusing of the added substance and the exposing.

17. The method as recited in claim 1 wherein the ionizing radiation includes electromagnetic radiation and further comprising adding a substance to a respective starting material of the respective at least one of the polymeric optical fiber, the preform of the polymeric optical fiber, and the fiber-core preform of the polymeric optical fiber so as to influence the predefined wavelength of the ionizing radiation needed to form the graded index profile.

18. The method as recited in claim 1 wherein the ionizing radiation includes particle radiation and further comprising adding a substance to a respective starting material of the respective at least one of the polymeric optical fiber, the preform of the polymeric optical fiber, and the fiber-core preform of the polymeric optical fiber so as to influence an effect of the particle radiation needed to form the graded index profile.

* * * * *